(12) United States Patent
Hanckel et al.

(10) Patent No.: US 7,970,742 B2
(45) Date of Patent: Jun. 28, 2011

(54) TECHNIQUES FOR IMPLEMENTING INDEXES ON COLUMNS IN DATABASE TABLES WHOSE VALUES SPECIFY PERIODS OF TIME

(75) Inventors: Robert Hanckel, Amherst, NH (US);
Jayanta Banerjee, Nashua, NH (US);
Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 972 days.

(21) Appl. No.: 11/292,138

(22) Filed: Dec. 1, 2005

(65) Prior Publication Data
US 2007/0130171 A1 Jun. 7, 2007

(51) Int. Cl.
*G06F 17/30* (2006.01)
(52) U.S. Cl. .................... 707/673; 707/683; 707/746
(58) Field of Classification Search ............... None
See application file for complete search history.

(56) References Cited

U.S. PATENT DOCUMENTS
6,223,182 B1 * 4/2001 Agarwal et al. ............... 707/102

OTHER PUBLICATIONS

Nascimento, Mario et al., "Indexing Valid Time Databases via B+ trees—The MAP21 Approach," TimeCenter Technical Report, Mar. 9, 1998, pp. 1-26.*
Vincent Lai, et al., "Temporal Databases: Model Design and Commercialization Prospects," Data Base, Aug. 1994, vol. 25, No. 3, pp. 6-18.*
Mario A. Nascimento and Margaret H. Dunham, "Indexing Valid Time Databases Via B+ -trees—The MAP21 Approach", A TimeCenter Technical Report, Mar. 9, 1998.

* cited by examiner

*Primary Examiner* — Neveen Abel-Jalil
*Assistant Examiner* — Farhan M Syed
(74) *Attorney, Agent, or Firm* — Vista IP Law Group, LLP

(57) ABSTRACT

Techniques for history enabling a table in a database system so that past versions of rows of the history-enabled table are available for temporal querying. The table is history enabled by adding a start time column to the table and creating a history table for the history-enabled table. The history table's rows are copies of rows of the history-enabled table that have changed and include start time and end time fields whose values indicate a period in which the history table's row was in the history-enabled table. Temporal queries are performed on a view which is the union of the history-enabled table and the history table. The temporal queries are speeded up by period of time indexes in which the leaves are grouped based on time period size, identifiers are assigned to the groups, and the keys of the index include the group identifiers.

14 Claims, 11 Drawing Sheets

| order_id | order_dt | cust_name |
|---:|---|---|
| 1 | 1/2/2000 | Jones |
| 2 | 1/2/2000 | Smith |
| 3 | 1/4/2000 | Green |
| 4 | 1/5/2000 | Miller |
| 5 | 1/7/2000 | Meyer |
| 6 | 1/10/2000 | Mulligan |

Order list 403 of orders received from 1/1/2000-1/12/2000

| order_id | order_dt | cust_name | start_time |
|---:|---|---|---|
| 3 | 1/4/2000 | Green | 1/4/2000 |
| 5 | 1/7/2000 | Meyer | 1/7/2000 | history-enabled table "Orders" 405 as of 1/12/2000

| order_id | order_dt | cust_name | start_time | end_time |
|---:|---|---|---|---|
| 1 | 1/2/2000 | Jones | 1/2/2000 | 1/5/2000 |
| 2 | 1/2/2000 | Smith | 1/2/2000 | 1/5/2000 |
| 4 | 1/5/2000 | Miller | 1/5/2000 | 1/8/2000 |
| 6 | 1/10/2000 | Mulligan | 1/10/2000 | 1/11/2000 |

"Orders_HISTORY$" 407 as of 1/12/2000

| order_id | order_dt | cust_name | start_time | end_time |
|---:|---|---|---|---|
| 1 | 1/2/2000 | Jones | 1/2/2000 | 1/5/2000 |
| 2 | 1/2/2000 | Smith | 1/2/2000 | 1/5/2000 |
| 4 | 1/5/2000 | Miller | 1/5/2000 | 1/8/2000 |
| 6 | 1/10/2000 | Mulligan | 1/10/2000 | 1/11/2000 |
| 3 | 1/4/2000 | Green | 1/4/2000 | ######## |
| 5 | 1/7/2000 | Meyer | 1/7/2000 | ######## |

"Orders_HISTORY_VIEW$" 409 as of 1/12/2000

Fig. 4

| order_id | cust_name |
|---|---|
| 1 | Jones |
| 2 | Smith |
| 3 | Green |

501

| order_id | cust_name |
|---|---|
| 1 | Jones |

503

| order_id | order_dt | cust_name | start_time | end_time |
|---|---|---|---|---|
| 1 | 1/2/2000 | Jones | 1/2/2000 | 1/5/2000 |
| 2 | 1/2/2000 | Smith | 1/2/2000 | 1/5/2000 |
| 4 | 1/5/2000 | Miller | 1/5/2000 | 1/8/2000 |
| 3 | 1/4/2000 | Green | 1/4/2000 | ######## |
| 5 | 1/7/2000 | Meyer | 1/7/2000 | ######## |

505

| order_id | cust_name |
|---|---|
| 4 | Miller |
| 6 | Mulligan |
| 3 | Green |
| 5 | Meyer |

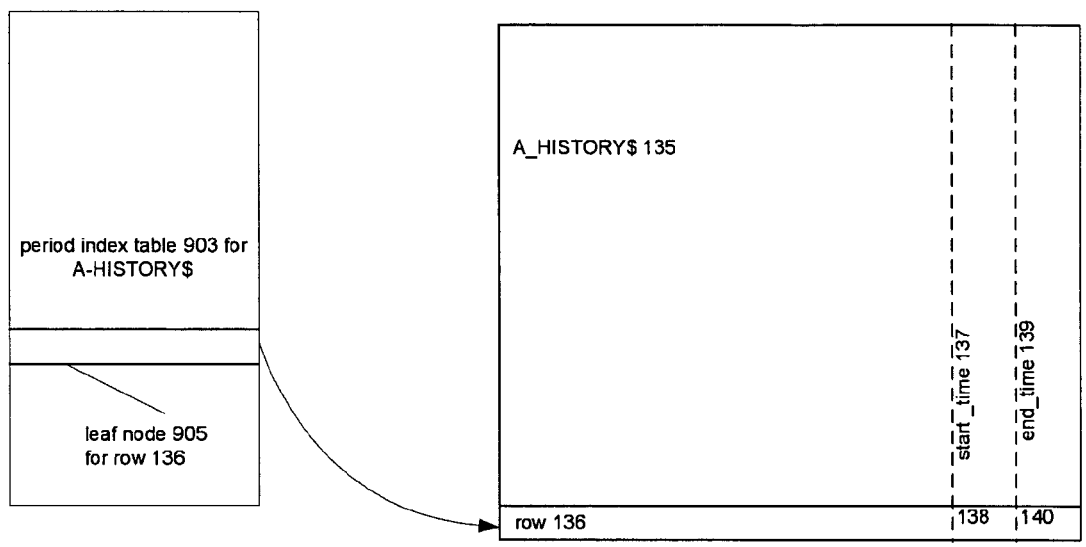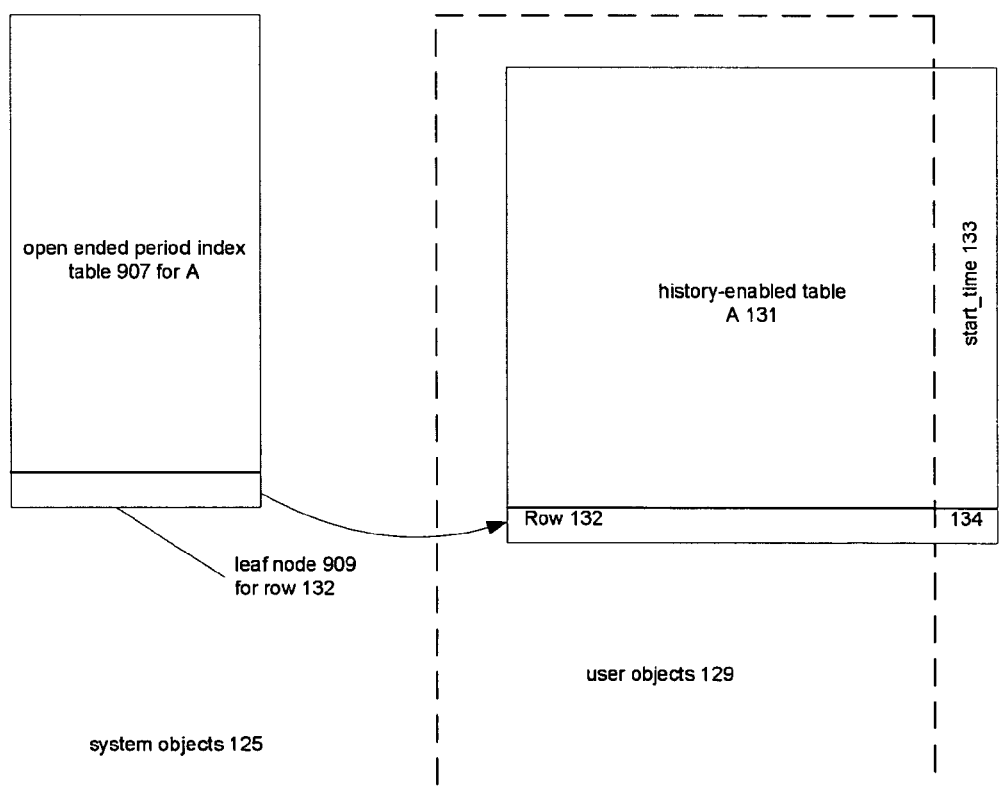
Fig. 9

```
       ┌─ SELECT COUNT(*)    ╱ 1005  ╱ 1007
       │  FROM timetable10k ╱       ╱
       │                                                    ╱ 1009
       │  WHERE xti_intersects_period(xti_time_index.make_period(btstamp,etstamp),
1003 ──┤       ┌─ '2004-OCT-21 07.00.32',
       │ 1011 ─┤  '2004-OCT-21 09.30.00',
       │       └─ 'YYYY-MON-DD HH24.MI.SS')=1;
       └                                         ╲ 1013
```

```
       ┌─ SELECT rowid           ╱ 1017
       │  FROM timetable10k_time_index
       │  ┌─ WHERE
1015 ──┤  │           ╱ 1019
       │  │  partition_id = 3 AND   ╱ 1021                  ╱ 1023
       │ 1018 ─┤  period BETWEEN
       │  │        encode_period('2004-OCT-21 07.00.24') AND  ⎫
       │  │        encode_period('2004-OCT-21 09.30.08');     ⎬ 1022
       └  └                                                   ⎭
                                                              ╲ 1025
```

1103 {
SELECT * FROM A_HISTORY_VIEW$ t
WHERE AS_OF (t, '2004-OCT-21 09.30.00') = 1
              ↑
              1105

1107 {
SELECT *
FROM A_HISTORY_VIEW$
WHERE xti_intersects_point(xti_time_index.make_period(btstamp,etstamp),
    '2004-OCT-21 09.30.00',         ~ 1109
    'YYYY-MON-DD HH24.MI.SS')=1;

110 {
  1111 {
    (SELECT *
    FROM A
    WHERE xti_intersects_point(xti_time_index.make_period(btstamp,etstamp),
        '2004-OCT-21 09.30.00',
        'YYYY-MON-DD HH24.MI.SS')=1)
  UNION ALL            ~ 1113
  1115 {
    (SELECT *
    FROM A_HISTORY$
    WHERE xti_intersects_point(xti_time_index.make_period(btstamp,etstamp),
        '2004-OCT-21 09.30.00',
        'YYYY-MON-DD HH24.MI.SS')=1);
}

TECHNIQUES FOR IMPLEMENTING INDEXES ON COLUMNS IN DATABASE TABLES WHOSE VALUES SPECIFY PERIODS OF TIME

CROSS-REFERENCE TO RELATED APPLICATIONS

U.S. Ser. No. 11/291,446, A DATABASE SYSTEM THAT PROVIDES FOR HISTRY-ENABLED TABLES, filed on even date with the present patent application and having the same inventors and assignee, contains the complete Detailed description from the present patent application up to the section titled Making indexes of fields whose values represent periods of time. U.S. Ser. No. 11/291,446 is hereby incorporated by reference into the present patent application for all purposes.

STATEMENT REGARDING FEDERALLY SPONSORED RESEARCH OR DEVELOPMENT

Not applicable.

PARTIES TO A JOINT RESEARCH AGREEMENT

Not applicable.

SEQUENCE LISTING

Not applicable.

BACKGROUND OF THE INVENTION

1. Field of the Invention

The invention relates generally to database systems and more particularly to techniques used in database systems for indexing rows of database tables by the values of fields in the rows which represent periods of time.

2. Description of Related Technology

The technology that is related to the disclosed database system that provides for history-enabled tables falls into two broad categories:
- Techniques for keeping track of insertions, updates, and deletions so that errors occurring during operation of the database system may be corrected; these techniques then form the basis of techniques for determining the past state of records and transactions in the database system; and
- Techniques for dealing with time information in database tables.

The techniques relative to these categories are explained in the following.

Keeping Track of Insertions, Updates, and Deletions in Database Systems

Most database tables contain only currently-valid information; when a row in the database table is updated or deleted, the information contained in the row prior to its modification or deletion is lost. It soon became apparent to database users that keeping the information that was discarded in the update or deletion was worthwhile. To begin with, the reason for keeping the information was to restore the original information if the update or deletion had been erroneously made. Possible sources of errors included the humans who were entering the data or administering the database system, bugs in queries and programs being executed in the database system, and transactions which failed before they could be completed and therefore had to be rolled back. A transaction in the present context is a sequence of database operations which the database system treats as a single unit: if all of the operations in the sequence are not completed, the transaction is rolled back by undoing all of the operations that did complete. When all of the operations have been undone, the database has been restored to the state it was in before the failed transaction took place with regard to the failed transaction. If the conditions that caused the transaction to fail have been eliminated, the transaction can then be redone. The database system maintained a redo log in which it kept a record of every change made in the database system; the redo log thus contained the information needed to correct mistakes or redo transactions. The only limitation on the redo log for correcting mistakes or redoing transactions was the amount of storage available in the database system for the redo log: the database system treated the redo log's storage as a circular buffer; when the buffer was full, the database system continued to write the redo log by overwriting the oldest entries in the log.

Early database systems allowed only one user to access them at a time; modern database systems may be accessed by hundreds of users at once. One consequence of this is that transactions for a number of users may be accessing the same database record at the same time. If everyone who is accessing the database record is simply reading the database record, such concurrent access presents no problem, but if some are reading the record and others are modifying the record, inconsistencies may result. For example, in a read-only transaction by a first user, the record should not change during the transaction, i.e., a read at the beginning of the transaction and a read at the end should have the same results. However, if another transaction by a second user changes the record during the first transaction, the two reads will not have the same result. One way of keeping this from happening is to use the copy of the record to be read in the redo log for both the first and second read. Database systems manufactured by Oracle Corporation, of Redwood City Calif., have long used this technique; recently, the SQL Server database system manufactured by Microsoft Corporation has begun employing a technique in which the version of a record that exists at the beginning of a transaction is maintained until the transaction is finished.

Eventually, designers at Oracle Corporation realized that the redo log was valuable not only to deal with errors and concurrency problems, but also as a source of historical information about the tables in the database system. Because the redo log had a record for every change made in the database system, it could be mined to find out what a table had looked like at a particular point in the past or to obtain a sequence of the changes made over time with regard to a single entity in the database system. In 2003, Oracle Corporation introduced a utility for reading the history of information in the database system from the redo log. This utility, termed Flashback, permitted users to query the redo log as if they were querying tables in the database system. The user specified a time in a query and Flashback reconstructed a snapshot of the tables in the query as they were at the specified time from the redo log and then performed the query on the reconstructed tables. The information from the query could be used to restore a table to a previous state or simply to see what the table looked like at the specified time. The user could also specify two times, and Flashback returned records as they had changed between the times. Of course, as with everything else that uses information in the redo log, Flashback can go no further back than the oldest available portion of the redo log. Another consequence of reconstructing the tables from the information in the redo log is that the further back into the redo log the database system has to go to reconstruct the table, the longer the reconstruction takes.

Techniques for Dealing with Time in Database Tables

There are of course many situations in which a user will include time information in a database table. A systematic discussion of the ways in which this may be done and of the difficulties that SQL, the standard language used to write queries in relational database systems, has in expressing queries involving time information may be found in Richard T. Snodgrass, *Developing Time-oriented Database Applications in SQL*, Morgan-Kaufmann Publishers, San Francisco, USA, 2000. Useful terminology from the Snodgrass book includes the following:

There are three fundamental temporal datatypes:
Instant: something happened at an instant of time (e.g., now, Jul. 18, 2005, when this is being written, or sometime, perhaps much later, when it is being read)
Interval: a length of time (e.g., three months)
Period: an anchored duration of time (e.g., the fall semester, Aug. 24 through Dec. 18, 1998)
There are three fundamental kinds of time.
User-defined time: an uninterpreted time value
Valid time: when a fact was true in the reality being modeled in the table
Transaction time: when a fact was stored in the database These kinds of time are orthogonal: a table can be associated with none, one, two, or even all three kinds of time. Snodgrass terms a table which is associated with valid time a valid-time state table; he terms a table which is associated with transaction time a transaction-time state table; he terms a table which is associated with both kinds of time a bitemporal table. Transaction-time state tables have the property that they can be reconstructed as of a previous date, and are thus particularly relevant to the following discussion.

In Snodgrass' examples, the transaction-time state for a table is simply incorporated into the table; a paper by Tal Kelly, *Using Triggers to track database action history* from the year 2001, which was found in Jul. 2005 at developerfusion.com/scripts/ print.aspx?id=2413, describes a technique for associating a history database table with a primary table. A row is inserted in the history table whenever a row is inserted into the primary table or an existing row in the primary table is updated. The history table has columns that are equivalent to those in the primary table and has additional columns that indicate the time at which the row in the primary table was inserted or updated and the operation in the primary table that resulted in the row being inserted in the history table. When a row is inserted in the primary table, the row inserted into the history table includes the data from the primary table row, the time the row was inserted in the primary table, and indicates that the operation was "insert". When a row is updated in the primary table, the row that is inserted in the history table has the data from the primary table row as it was before the update, the time the row was updated in the primary table, and indicates that the operation was "update".

The rows are inserted into the history table by triggers, that is, user-written code that is automatically executed by the database system when certain events occur with regard to a table. Two of the events which may result in the execution of a trigger are the insertion of a row and the update of a row; thus, an insertion of a row in the primary table results in an execution of an update trigger that creates the row corresponding to the insertion operation in the history table; similarly, the update of a row results in an execution of an update trigger that creates the row corresponding to the update operation.

It should be pointed out here that the history table is an example of a transaction-time state table, albeit one that is rather hard to use, because Kelley's history table entry only specifies when the operation on the primary table that resulted in the creation of the row in the history table creation was performed and because the meaning of the time value depends on the operation on the primary table that caused the history table row to be created: in the case of an insertion, the time value indicates when the corresponding row in the primary table began existing; in the case of an update, the time value indicates when the corresponding row in the primary table ceased existing in the form specified in the history table row. Thus, using Kelley's history table to figure out the time period during which a given row of the history table existed in the primary table is a complex and expensive operation.

As can be seen from the foregoing, currently-available techniques for keeping track of the history of a file in a relational database system have their drawbacks: Flashback is easy to use but requires a relational database system that keeps a redo log and is limited by the redo log: if the information for the table to be reconstructed is no longer in the redo log, Flashback cannot reconstruct the table; further, the time it takes to reconstruct the table is determined by how much of the redo log Flashback has to read to obtain the information necessary to reconstruct the table. It is of course possible for users of database systems to implement their own arrangements for keeping track of the history of tables of interest, but as the Snodgrass book demonstrates, more than ordinary expertise in SQL is required to properly construct and use arrangements for keeping track of the history of tables, and the Kelley reference serves as an illustration both of the required programming expertise and of some of the pitfalls involved in making one's own arrangements to keep track of the history of a table. What is needed is a technique for keeping track of the history of individual tables of interest which is as easy to use as Flashback but does not depend on the redo log and consequently is not limited by the amount of redo log available and does not require reading the redo log. It is an object of the invention disclosed herein to provide such a technique.

A further object of the invention is to provide efficient techniques for performing temporal queries on tables which contain columns whose values specify periods of time. Temporal querying of such tables of validity of each row is typically very expensive. The processing time increases linearly with the number of rows even when one or both of the time stamps defining the time period is separately indexed with a B-Tree index.

BRIEF SUMMARY OF THE INVENTION

The object of the invention is attained with regard to performing temporal queries by an index in a relational database management system that indexes a table object which has one or more time period columns from whose values in a row a period of time may be determined. The index indexes the rows of the table object by the periods of time. The periods of time further have a range of sizes. In the index, the leaves of the index are grouped by disjunct subranges of the range of sizes, with leaves that belong to a group indexing periods of time whose sizes belong to the subrange to which the group corresponds.

In other aspects, the keys for the index include a group specifier that specifies a group. The group specifiers have a lexicographic order. They further specify the subrange corresponding to the group. The subrange specifier for the group corresponding to a given subrange may be calculated from the size of a given period of time. Each leaf contains a representation of a period of time, and within a group, the leaves are ordered by a component of the representation. In one version of the invention, the representation of the period of time specifies a start time and an end time and the leaves are ordered by the start time.

In yet another aspect, the index is divided into partitions and each group of leaves has its own partition.

The index may be made using an index-organized table that contains a $B^+$ index.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWING

FIG. 4 is an example history-enabled table;

FIG. 5 shows sets of rows returned by temporal queries on Orders_HISTORY_VIEW$ table 409;

FIG. 9 shows how the index of FIG. 8 may be used with history-enabled tables;

FIG. 10 shows how the index of FIG. 8 my be used to find the intersection between a given time period and other time periods; and FIG. 11 shows how an AS_OF query is executed using the index of FIG. 8. Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description will begin with a description of a relational database system in which history-enabled tables may be implemented, will then provide overviews of how history-enabled tables are implemented in the relational database system and of operations on history-enabled tables, and will finally provide a detailed example of a history-enabled table.

Figure 1:
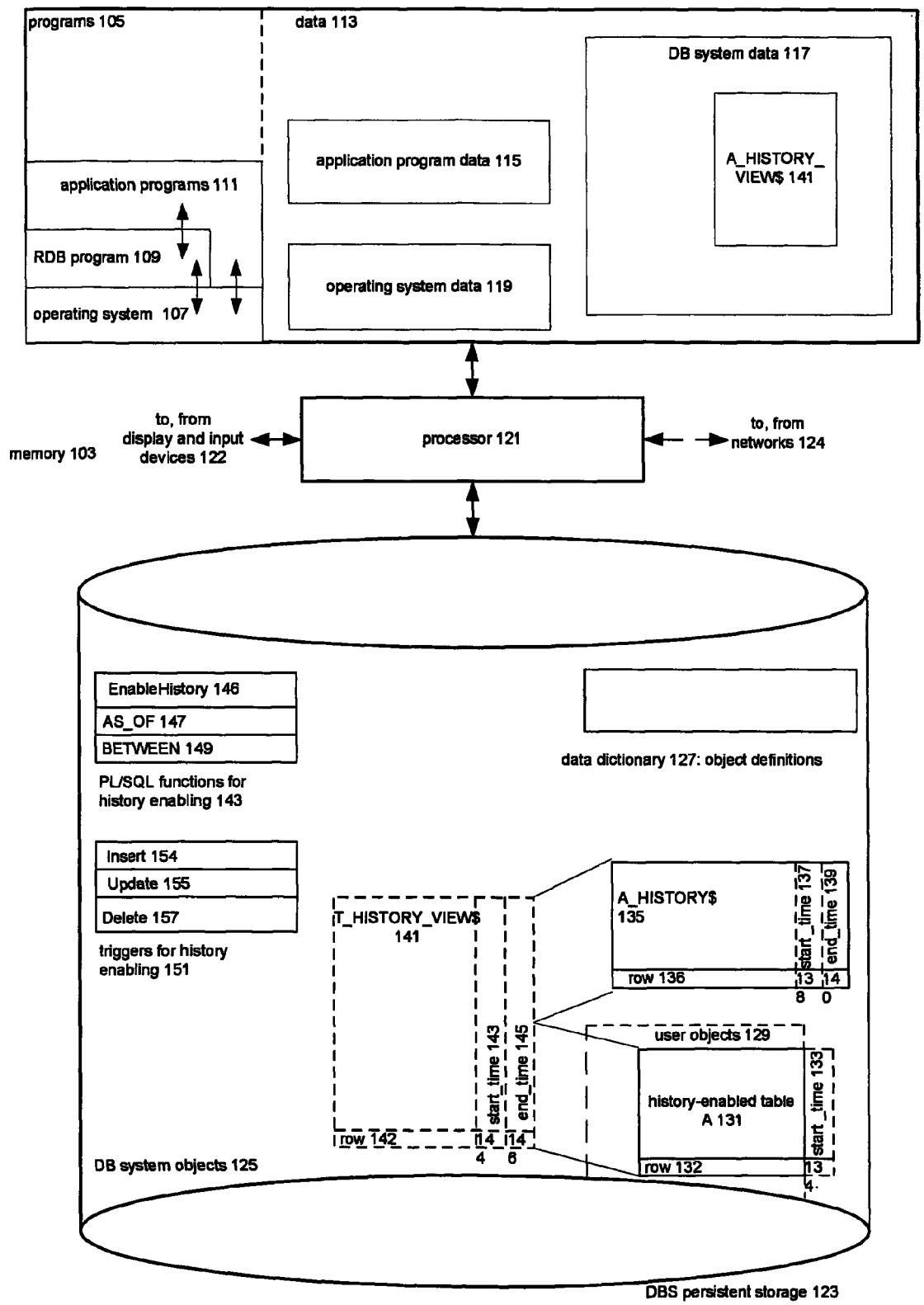
FIG. 1 shows a relational database management system in which history-enabled tables has been implemented.

A Relational Database System in which History-Enabled Tables may be Implemented: FIG. 1

The history-enabled tables disclosed herein may be implemented in any relational database system. FIG. 1 shows the portions of a typical relational database system 101 that are relevant to the present discussion and how history-enabled tables are implemented in database system 101. The main components of system 101 are a processor 121, a memory 103 which contains programs 105 being executed by the processor and data 113 involved in the program executions, and persistent storage 123 for the database system's tables and other objects. Processor 121 may further receive inputs from input devices such as a keyboard and/or pointing device and produce outputs to a display device such as a CRT, as shown at 122, and may also receive inputs from and provide outputs to one or more networks, containing other processors, as shown at 124.

When system 101 is operating, programs 105 in memory 103 include an operating system 107, a relational database system program 109, and application programs 111 that employ the services provided both by operating system 107 and database program 109. Correspondingly, data 113 in memory 103 includes data for the application programs 115, data for the operating system 119, and data for the database system. Operation typically involves an application program 111, which provides a query to relational database program 109. Database program 109 executes the query on the tables in persistent storage 123 and provides the result to application program 111. Both RDB program 109 and application program 111 use the services provided by operating system 107, and execution of the application program or the database RDB program may involve inputs from and outputs to I/O devices and the network.

Continuing in more detail, persistent storage 123 contains two classes of objects: DB system objects, which are objects, including tables, that are defined by database system 101 and are used by database system 101 to manage and operate the database system, and user objects 129, which contain tables and other objects defined by users of the database system. Data dictionary 127 contains definitions of all of the objects in the database system.

The most important objects in database system 101 are tables. A table defines a set of rows, all of which have the same columns. There are three kinds of tables in most database systems: base tables, views, and materialized views. Base tables are the tables that are the actual sources of the data in the table rows returned by a query. Views are tables which do not exist in their own rights in persistent storage 123, but are instead created using data from other tables. A view is defined in the data dictionary by a query on other tables. The other tables may also be views, but the data must ultimately come from base tables. A materialized view is a view of which, for reasons of efficiency, a copy has been made in persistent memory. A Data dictionary 127 contains definitions of base tables, of tables defined in terms of the base tables, and definitions of other objects that are defined for the tables. These other objects include indexes, which speed up access to the data contained in a column of a table, triggers, which define actions to be taken upon occurrence of events concerning the table, and functions, which are programs that operate on database system objects. In a preferred embodiment of database system 101, the functions are written in the well-known PL/SQL language.

Implementing a History-Enabled Table in Database System 101

FIG. 1 shows the objects in database system 101 that are required to implement a history-enabled table. Except for the table which is being history-enabled, all of the objects that implement the history-enabled table are system objects that are defined by RDBMS 101. In RDBMS 101, the table that has been history-enabled is table A 131. The table that is history-enabled will generally be user-defined, but may of course be system-defined as well. In the preferred embodiment, any table which is defined as one that can exist in RDBMS 101, i.e., is a base table or a materialized view, may be history enabled.

History-Enabled Tables and Related Tables and Views

When table A 131 is history-enabled, RDBMS 101 adds a system-defined column to the table. The column, which appears as start_time column 133 in table A, contains time stamp values. For each row 132 in table A, the time stamp value in start_time column 133 indicates when the row last changed. Thus, when the row is first inserted into the table, the row's start_time field is set to the time at which the row was inserted; each time the row is updated, the row's start_time field is set to the time at which the row was updated.

Besides adding start_time column 133 to the history-enabled table, RDBMS 101 creates a new table A_HISTORY$ 135 which contains copies of rows that have changed in table A 131. The change may be either an update of the row or a deletion of the row. Each row 136 in table A_HISTORY$ 135 contains the data for a changed row 132 in table A as it was prior to the change, including the value of the row 132's start_time field 133, as may be seen from start_time column 137 in A_HISTORY$ table 135. Table 135 thus has all of the columns of table A 131. In addition to having all of the columns of table A 131, A_HISTORY$ 135 has another timestamp column, which appears in FIG. 1 as end_time column 139. The value of this column in each row 136 is set to the time at which the update or deletion operation on table A 131 occurred which caused the copy of the row to be made in A_HISTORY$ 135. Thus, the values in the fields belonging to start_time 137 and end_time column 139 indicate the period during which the row 132 of which row 142 is a copy existed in history-enabled table A 131. As can be seen from this description, A_HISTORY$ table 135 is thus what Snodgrass terms a transaction-time state table with regard to all rows 132 of table A 131 which have been deleted or updated since they were inserted into table A. Tables A 131 and A_HISTORY$ 135 between them are further a transaction-time state table with regard to all rows of table A 131 that have existed since table A was history-enabled.

RDBMS 101 produces this complete transaction-time state table for table A 131 by means of system-defined A_HISTORY_VIEW$ 141, which is a union of all of the rows 132 from table A 131 with all of the rows 136 from A_HISTORY$ table 135. View A_HISTORY_VIEW$ 141 has all of the columns of A_HISTORY$ table 135, including start time column 143 and end_time column 145; when a row 142 of A_HISTORY_VIEW$ 141 comes from table A 131, it has a symbolic value of −1 in its field in end_time column 145, indicating that the row 142 corresponds to a row 132 that still exists in table A 131.

Figure 2:
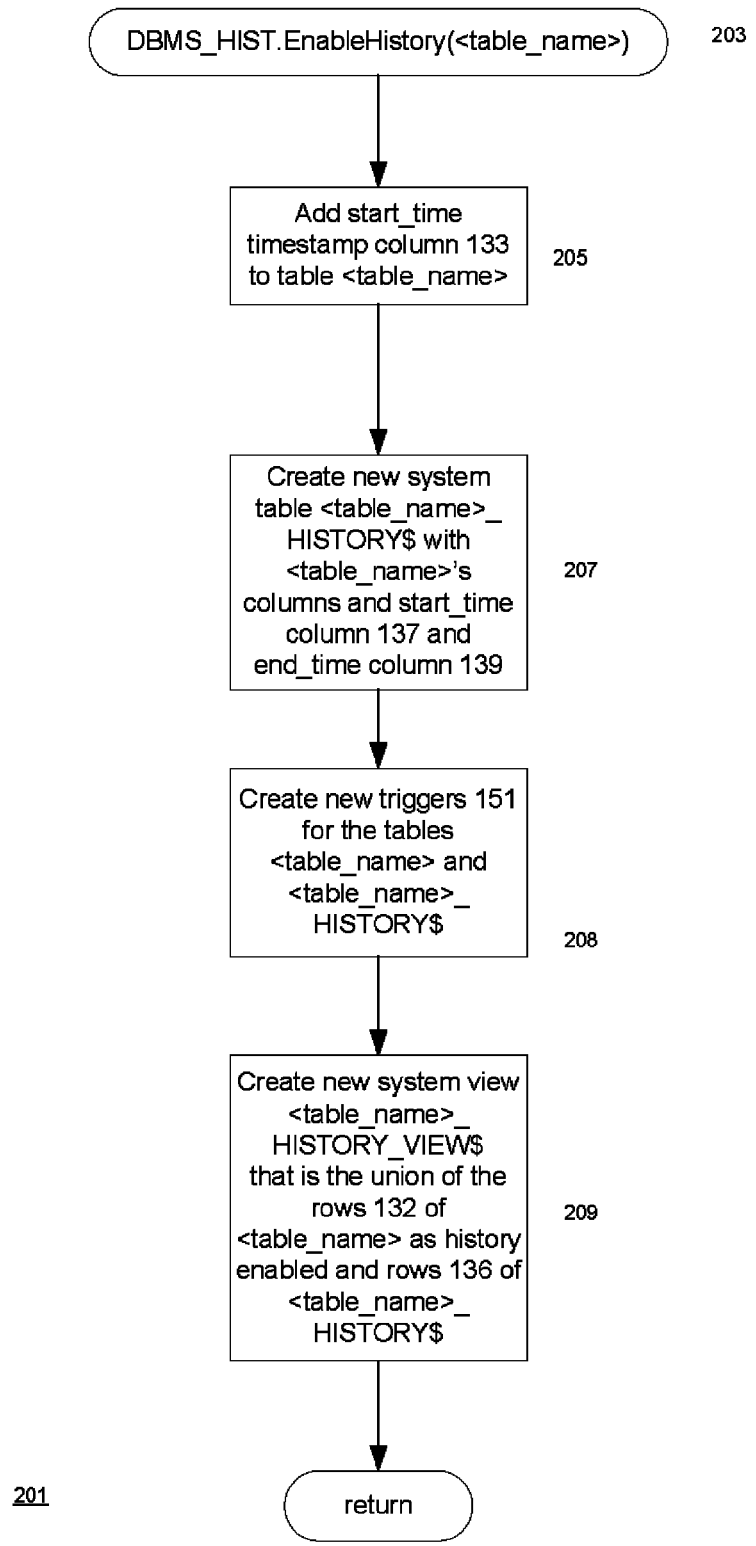
FIG. 2 is a flowchart of the EnableHistory PL/SQL procedure.

Making a Table into a History Enabled Table: FIG. 2

In a preferred embodiment of RDBMS 101, RDBMS 101 includes a system-provided PL/SQL procedure called DBMS_HIST.EnableHistory. The procedure is shown at 146 in FIG. 1. In a preferred embodiment, the procedure takes a single argument: the name of the table in RDBMS 101 which is being history-enabled. Of course, the name may be a value returned by a PL/SQL function that defines the table and returns its name. In other embodiments of EnableHistory, the arguments may contain the information needed to define the table to be history enabled. FIG. 2 is a flowchart 201 of DBMS_HIST.EnableHistory 146.

The PL/SQL interface for invoking EnableHistory 146 is shown at 203. When executed, the code performs four operations:

it adds start_time timestamp column 133 to the definition in RDBMS 101 of the table 131 that is being history enabled (205);

it creates HISTORY$ table 135 corresponding to history-enabled table 131. Table 135 has all of the columns of table 131 as history enabled, and additionally has end_time timestamp column 139 (207);

it creates the triggers 151 that maintain the start_time fields 134 in history-enabled table 131 and the start_time fields 138 and the end_time fields 140 in A_HISTORY$ table 135 (208); and it creates HISTORY_VIEW$ view 141 corresponding to history-enabled table 131. View 141's rows 142 are the union of the rows 132 of the history-enabled table and rows 136 of HISTORY$ table 135 (209).

An important advantage of history-enabled tables such as table 131 is that they can be new tables which include a start_time column 133 or be made from preexisting tables by simply adding start_time column 133 to the preexisting table. When a preexisting table is history enabled, a question arises as to how the time stamps in start_time column 133 should be set for the rows that were in table 131 at the time it was history enabled. The preferred embodiment offers the user two choices in this regard:

start_time for all of the preexisting rows is set to the time at which the table was history-enabled; or start_time for the preexisting rows is set to the time at which the table was created; this time is obtainable from the definition of the table in data dictionary 127.

In the preferred embodiment, the default is the time at which the table was history enabled; a parameter in the invocation of EnableHistory may be used to specify the other alternative.

Figure 3:
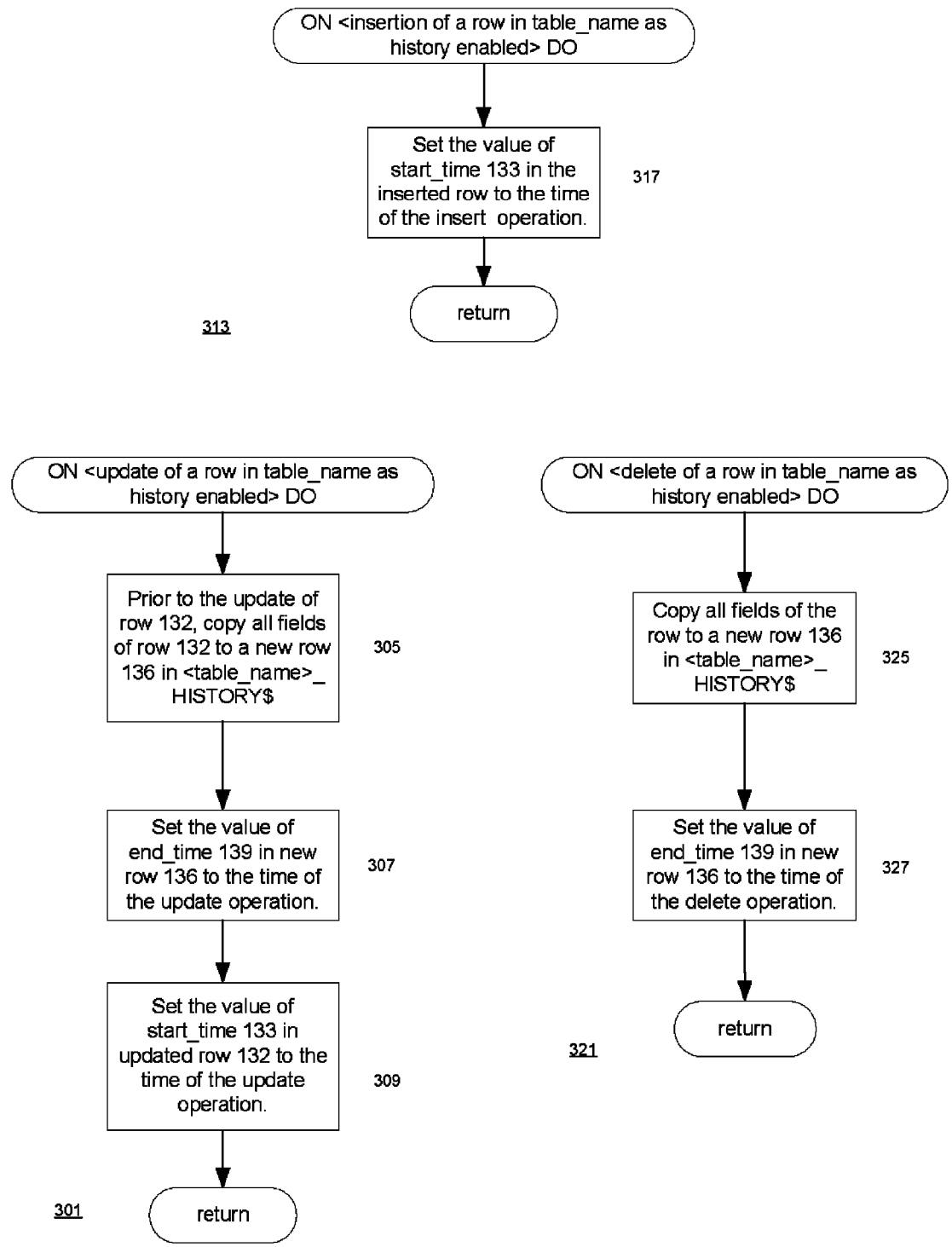
FIG. 3 is flowcharts of triggers used in a preferred embodiment.

Maintaining a History-Enabled Table: FIG. 3

Once a table has been history-enabled, start_time fields 133 in the table's rows 132 and the rows of HISTORY$ table 135 are maintained by triggers that are executed whenever a row 132 is inserted, updated, or deleted. There is a trigger for each of these actions. The triggers are shown at 151 in FIG. 1 and FIG. 3 has flowcharts for the triggers.

Shown at 313 is the flowchart for insert trigger 154. The only action performed by this trigger is setting the value of start_time field 133 in the row to the time of the insert operation. The flowchart for update trigger 155 is shown at 301. Prior to the update on row 132, trigger 155 copies all of the fields of the updated row to a new row 136 in HISTORY$ table 135 (305). Then trigger 155 sets the value of end_time field 139 in new row 136 to the time of the update operation (307). Finally, trigger 131 sets the value of start_time field 133 to the time of the update operation (309). The flowchart for delete trigger 157 is shown at 321. As may be seen there, steps 325 and 327 are identical with that of steps 305 and 309 of the update operation, except that because the row 132 in history-enabled table 131 is being deleted, there is no deed to update that row's start_time field 133.

Performing Temporal Queries on a History-Enabled Table

When a table is history enables, temporal queries may be executed on HISTORY_VIEW$ view 141. As a view, HISTORY_VIEW$ is constructed by RDBMS 101 in DB system data 117 when the query on the view is executed. The start_time field 143 and end_time field 145 in each row of HISTORY_VIEW$ specifies either a period of time which has ended (if the row is from HISTORY$ table 135) or a period of time which has not yet ended (if the row is from history-enabled table 131). In a preferred embodiment, two queries are permitted over these periods of time: AS_OF 147, which takes a given instant of time as a parameter and determines what rows 142 in HISTORY_VIEW$ 141 have periods of time defined by fields 143 and 145 such that the instant of time is included in those periods, and BETWEEN 149 which takes a given period of time as parameter and determines what rows 142 have periods of time defined by fields 144 and 146 such that the given period of time overlaps some or all of the row's period of time. It must be noted that the AS_OF operator always returns at most one historical incarnation of any row of the history-enabled table. The BETWEEN operator, in contrast, may return multiple incarnations of any row of the history-enabled table. Other quires are possible with regard tot eh periods of time: whether the given period of time is contained in the row's period of time, whether it spans the row's period of time, whether the given period of time abuts but is before the row's period of time, and whether the given period of time abuts but is after the row's period of time. Other ways of representing the periods of time are also possible. Among them are a single timestamp column and an interval of time column and a single timestamp column and other information in the table from which the period of time can be computed given the time stamp.

In a preferred embodiment, AS_OF and BETWEEN are both implemented as PL/SQL functions that are employed in the WHERE clause of an SQL query. The functions construct subqueries from the arguments in the function that return rows that satisfy the AS_OF condition or the BETWEEN condition. The AS_OF function invocation looks like this:

AS_OF (<HISTORY_VIEW$ table name>,<date>)

The subquery that AS_OF produces looks like this:

SELECT * FROM <HISTORY_VIEW$ table name>
  WHERE
  (<date>≧start_time) AND ((<date>≦end_time) OR
  (end_time=−1))

The BETWEEN function invocation looks like this:

BETWEEN (<HISTORY_VIEW$ table name>, <lb_date>, <ub_date>)

where <lb_date> is the lower bound of the given period of time and <ub_date> is its upper bound.

The subquery that BETWEEN produces looks like this:

SELECT * FROM<HISTORY_VIEW$ table name>
  WHERE
  (<ub_date≧start_time) AND ((<lb_date>≦end_time) OR
  (end_time=−1))

It should be pointed out at this point that the exact syntax used to history enable a table or to invoke a temporal query on the table is a matter of designer's choice and may vary from one SQL implementation to another. In the preferred embodiment, PL/SQL functions are used for the interfaces and the fact that the temporal query is performed on the HISTORY_VIEW$ view is not hidden from the user; in other embodiments, the SQL language may be extended to permit a table to be history-enabled and temporal queries to be made on it without the use of PL/SQL functions and the HISTORY_VIEW$ view may be hidden from the user. Similarly, the temporal query operations provided, the names that are given them, their semantics, and their syntax are a matter of designer's choice and may vary from one SQL implementation to another.

An Example: FIGS. 4 and 5

FIG. 4 presents an example 401 of a small history-enabled table Orders 405. The table has four columns: order_id, which is the ID number for an order, order_dt, which is the date the order was received, cust_name, which is the name of the customer making the order, and start_time, which the RDBMS added to Orders when it was history enabled. Orders is a table of orders that are currently being processed: when an order is received, an entry is made in Orders; when the order has been filled, the entry is deleted. Updates occur only when the data in the table has to be corrected. The invocation of DBMS_HIST.EnableHistory that history enabled the table looked like this:

DBMS_HIST.EnableHistory ('Orders')

At 403 is shown a list of orders received from Jan. 1, 2000 through Jan. 12, 2000. This list is not kept in the RDBMS, but is provided here to aid in understanding the contents of the tables of FIG. 4.

Because Orders is history enabled, the RDBMS that contains Orders also contains Orders_HISTORY$ 407, which has a row for every row has been updated or deleted from Orders. The rows in Orders_HISTORY$ thus include a row for every order which has been filled. Finally, the RDBMS provides the view Orders_HISTORY_VIEW$, which is the union of the rows that are currently in Orders 405 and Orders_HISTORY$ 407. Orders 405, Orders_HISTORY$ 407, and Orders_HISTORY_VIEW$ 409 are all shown as they are as of Jan. 12, 2000. As already explained, the rows in Orders_HISTORY$ 407 are inserted into table 407 by a trigger that is executed whenever a delete or update operation is performed on a row of Orders 405 and view 409 is the union of tables 405 and 407.

As can be seen from Orders 405 and Orders_HISTORY$ 407, filling an order generally takes three days; two orders, numbers 3 and 5, however, are taking longer, and one order, number 6, was filled in a single day. The fact that 3 and 5 have not yet been filled is indicated in Orders_HISTORY_VIEW$ 409 by ####in the end_time field.

Some example temporal queries on Orders_HISTORY-VIEW$ 409 are the following:

SELECT t.order_id, t.cust_name FROM Orders_HISTORY_VIEW$ t
  WHERE AS_OF (t, '1/4/2000')=1

For each row that the AS_OF operator is evaluated on, the value returned by the operator is either true or false. In a preferred embodiment, if the value is false, AS_OF evaluates to 0; if true, AS_OF evaluates to 1. The above query returns rows for all of the orders that were in the process of being filled on Jan. 4, 2000; The rows are shown at 501 in FIG. 5. Note that they include the row for order 3, which, since it still has not been filled, is still in Orders table 605.

Of course, the output of AS_OF may be further filtered by other elements of the WHERE clause:

SELECT t.order_id, t.cust_name FROM Orders_HISTORY_VIEW$ t
  WHERE t.cust_name='Jones'
  AS_OF (t, '1/4/2000')=1

This query returns the single row shown at 503.

Here are some BETWEEN queries:

SELECT * FROM Orders_HISTORY_VIEW$ t
  WHERE BETWEEN (t, '1/4/2000' '1/7/2000')=1

BETWEEN returns true or false in the same fashion as AS_OF. The above query returns all of the orders that were in process between the two dates given, including those for which the processing had begun before Jan. 4, 2000, but finished during or after Jan. 7, 2000 and those for which the processing had begun on or after Jan. 4, 2000 and finished after Jan. 7, 2000. As shown at 505, the returned rows are thus the rows for every order but order 6, for which the processing began after Jan. 7, 2000.

Another example, for the time period Jan. 8, 2000 and Jan. 10, 2000, this time with only the order_id and cust_name columns being selected:

SELECT t.order_id, t.cust_name FROM Orders_HISTORY_VIEW$ t
  WHERE BETWEEN (t, '1/8/2000', '1/10/2000')

The result is shown at 507; the data comes from all of the orders but the first two, for which processing was finished before the beginning of the time period specified in the query.

Determining what Values to Use for Start_Time and End_Time

In the foregoing discussion, we have presumed that the database transactions in which the insertion and update operations occur which set the time stamp value of a start_time field 133 or the update and deletion operations occur which make new rows in HISTORY$ table 135 and set the time stamp values of start_time field 137 and end_time field 139 are substantially instantaneous; in fact, however, the lengths of transactions may vary, and some transactions may continue for a considerable period of time. Further, transactions may overlap; one transaction may start earlier and end later than another transaction. There are three times in a transaction that can be used to the start_time and end_time timestamps:

- the transaction start time: the time at which the transaction that inserts, updates, or deletes a row in history-enabled table 131 begins;
- the transaction commit time: the time at which the transaction commits, i.e., the time at which the database system actually makes the changes to the database system that occur during the transaction permanent; and
- the DML time for the change that causes the timestamp to be set. The DML time is the time in the transaction at which the row is inserted, updated, or deleted, but the transaction has not yet been committed. DML stands here for Data Manipulation Language, the subportion of the SQL query language, that is used to manipulate the data in a database table. Insert, update, and delete are all DML operations.

Each of these times can be used for the start_time and end_time timestamps and each has difficulties.

The most accurate time to use is the commit time of a transaction. At that time, all DML operations (update, insert, delete) have been committed, and all changes to the database become permanently available for the future. However, there is an overhead associated with using the transaction end time. When a DML operation happens, the commit time for the transaction performing the DML operation is not yet known; consequently, the DML operation cannot set the start_time and end_time fields. Instead, these fields must be set by an additional commit trigger which is executed when the transaction that performed the DML operations is committed. The need to execute the commit trigger requires extra CPU time and occasionally added I/O time for rows that have been paged out by the database system's paging algorithm and must be paged back in in order to set the start_time and end_time fields.

The start time of the transaction is known when the insert, delete, or update operation is performed, so the start_time and end_time fields can be set as part of the insert, delete, or update operation. The problem comes when a short transaction T2 starts after and commits before a long transaction T1. Starting after T1, but before T1 has touched row R, T2 updates row 132 in history-enabled table 131 R to R', so that R is copied to a new row 136 in HISTORY$ table 135. The timestamps in row R' 132's start_time field 143 and in row R 136's end_time field 139 are both set to the start time of T2, T2start. After T2 commits, T1 updates row R' 132 to R" in history-enabled table 131 and copies R' to a new row 136 in HISTORY$ table 135. The timestamps in row R" 132's start_time field 143 and in row R' 136's end_time field 139 are both set to the start time of T1, T1start, which is earlier than T2start. Thus, R" will have an earlier timestamp than R' even though the change that produced R' happened earlier than the change that produced R".

Using the DML time to set the timestamp values in start_time fields 133 and end_time fields 139 avoids both the extra overhead of using the transaction's commit time and the possible inconsistencies of using the transaction's start time The difficulty with using the DML time is that there is a potential for seeing inconsistent historical data when a transaction is long and a query is made during the transaction which simultaneously views two time-separated updates. For example, assume that a transaction performs a transfer of $100 from a checking account to a savings account on a day X as follows: at 1:00, the transaction deducts the $100 from the checking account; at 2:00, the transaction adds the $100 to the savings account. If the table for the checking account and the table for the savings account are both history-enabled, the start_time timestamp for the copy of the row affected by the transaction in the checking account table's HISTORY$ table 135 will say 1:00. The end_time time stamp for the copy of the row affected by the transaction as it was prior to the transaction in the savings account's HISTORY$ table will say 2:00. If an AS_OF query is later made of the savings and checking account tables to see the combined balance in the two accounts as it was as of 1:30 on day X, the AS_OF query will see the record for the deduction in the checking account table's HISTORY$ table, but will not see the record for the addition to the savings account in the savings account table's HISTORY$ table and the total balance will be $100 too low.

Figure 6:
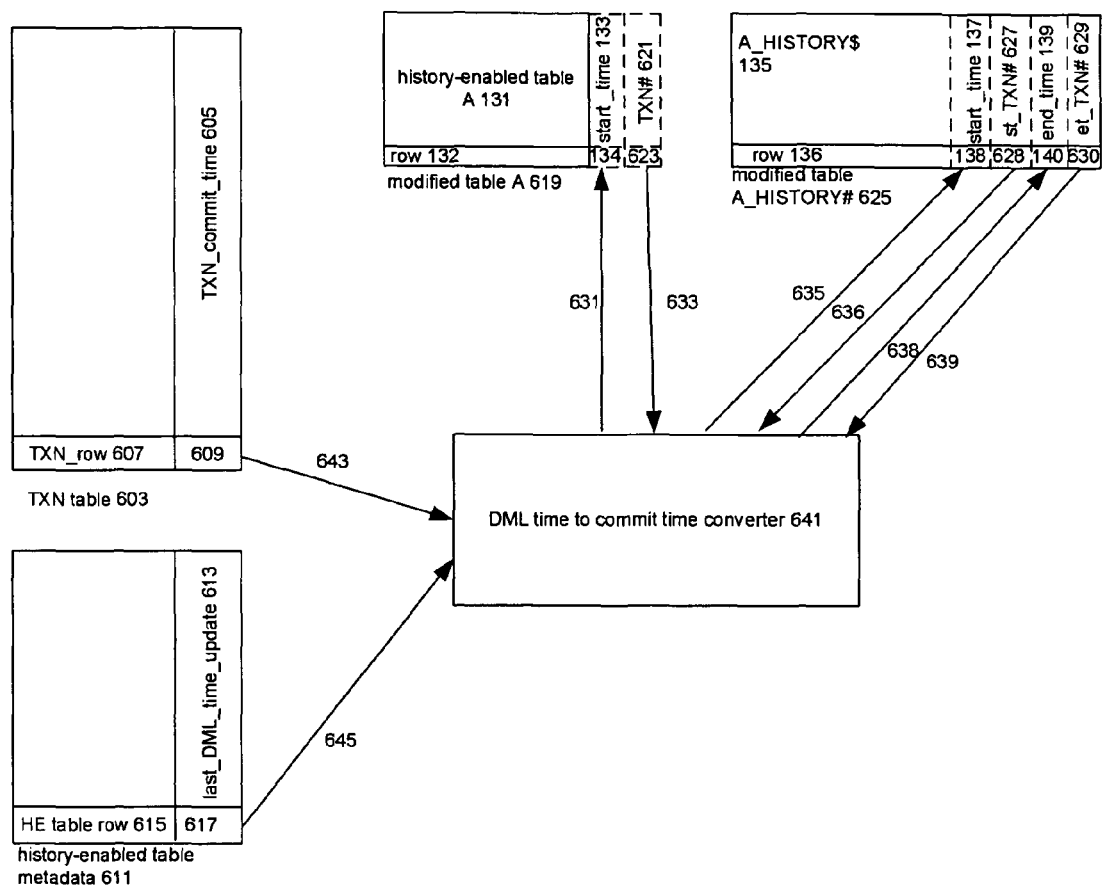
FIG. 6 shows a version of a history-enabled table that permits the use of DML times for start_time and end_time.

A Solution to the Problems of Using DML Time: FIG. 6

Both the original and history tables are enhanced with an additional transaction number column for each start_time column 133 and 137 and end_time column 139. The values in the transaction number columns indicate the transactions in which the values in the start_time and end_time columns changed. These enhanced tables are shown at 619 and 625 in FIG. 6 and the added columns at 621, 627, and 629. Whenever a timestamp is written in start_time field 133, the transaction number for the transaction that performed the operation that caused the timestamp to be written is written to the corresponding transaction number field 623 through flow 633; when a new row 136 is written in A_HISTORY$ table 135, fields 134 and 623 from the row in table A 131 are written and to fields 138 and 628 through flows 635 and 636, and when field 140 is written through flow 638, the transaction number for the transaction that caused the new row 136 to be written is written to field 630 through flow 639.

Further, we separately maintain a record of the commit timestamps of all transactions. This information is traditionally maintained in a system table in most database systems. In FIG. 6, it appears in TXN table 603, which has a row 607 for each transaction. A transaction's row is accessible by transaction number. One of the columns in table 603 is TXN_commit_time 605, Field 609 belonging to this column in each row contains the commit time for the row's transaction. There is also a system utility program—here termed DML time to commit time converter 641 which can be invoked occasionally during quiet periods (say, Sundays at midnight) to convert the DML times in fields 134, 138, and 140 to commit times. Only the most recently changed rows need to be touched, those that were changed after the immediately prior invocation of the utility program for the history-enabled table. The information as to the last invocation of the utility program for a given history-enabled table is contained in a system table 611 of history-enabled table metadata which contains a row 615 for each history-enabled table. There is a column 613 in this table for the last time the DML times in the history-enabled tables were updated to commit times, and the field 617 for this column in a given row has a time stamp for the last time the updating was done for the history-enabled table represented by the row.

The algorithm is straightforward: When utility program 641 is invoked for a given history-enabled table (table A 131 in FIG. 6), it obtains the timestamp for the last time the DML times in table A 131 and its associated A_HISTORY$ table were updated to commit times from field 617 in history-enabled table metadata 611 (arrow 645) and then finds the rows in tables A 131 and A_HISTORY$ 135 whose timestamps in fields 134, 138, and 140 indicate times later than the time of the last update. These timestamps specify DML times. For each of these rows and for each timestamp in the that indicates a time later than the time of the last update, converter 641 uses the transaction number associated with the timestamp to query TXN table 603 for commit time 609 for the transaction, as shows by arrow 643, and replaces the DML time time stamp with the commit time timestamp from TXN table 603. The flow of transaction numbers from these rows to the converter is shown at 623, 628, and 630; the flow of commit time timestamps that replace the DML time stamps is shown at 631, 636, and 638. It should be pointed out here that the foregoing technique for converting a non-commit-time time stamp that identifies the time of an event in a transaction to a commit time time stamp for the transaction can be used in any situation in which the row that has the non-commit-time time stamp for the time of the event includes a field whose value is the transaction number for the transaction in which the event occurred.

Of course, an RDBMS may provide both options: commit time as the start and end times where total consistency is required and DML time for high run-time performance. A further option with DML time would be the table modifications and timestamp conversion utility program just discussed.

Making Indexes on Fields whose Values Represent Periods of Time
Representing Periods of Time in Database Tables A history-enabled table 131 and its HISTORY$ table 135 are both examples of tables which include fields that represent periods of time. In the following, such tables will be called time period tables. In the case of history-enabled table 131, the periods of time are open-ended, i.e., they have a start time but no end time; in the case of HISTORY$ table 135, they are closed, i.e., the period has both a start time and an end time. HISTORY_VIEW$ table 141 has periods that are both open ended and closed. The periods of time in a time-period table may be represented in a number of ways: the simplest is by means of two columns whose fields have values that specify a time; in the following such values will be termed timestamp values and the columns containing them timestamp columns; one of the columns contains the timestamp values for the start time for the periods in the table; the other gives the time stamp values for the end time for the periods or a value indicating an open-ended period. As already mentioned, other ways of representing periods of time may be employed. One other way of representing periods of time can be applied with two tables like the history-enabled table and its history table, where modification of a row in the first table resulted in a copy of the row as it was prior to modification being made in the second table. In this case, the period might be specified in the second table by a first time stamp from the copied row indicating when the copied row was last modified and a second time stamp that indicated when the copied row was added to the second table.

Time Period Queries

The presence of columns representing periods of time in a table makes many interesting queries involving time periods possible. These queries, termed herein time period queries, include the following:

finding rows of the table whose time periods contain a given time; such a query is termed herein a location query;

finding rows of the table whose time periods intersect a given time period; such a query is termed an intersection query;

finding rows of the table whose time periods are included within a given time period; such a query is termed an inclusion query; and finding rows of the table whose time periods contain a given time period; such a query is termed a containment query.

Negations of these queries, for example, all of the rows whose time periods do not include a given time, are also possible.

The problem with all of these queries is that they are expensive. For example, even the simplest query, a location query, requires first finding the set of rows in the table whose start time is less than or equal to the given time and then finding the subset of those rows whose end time is greater than or equal to the given time. An intersection query requires doing a first location query to find the set of rows having periods whose start time is contained within the given time period, a second location query to find the set of rows whose end time is contained within the given period, and then removing the duplicates returned for rows whose start time and end time are both contained in the given period.

Figure 7:
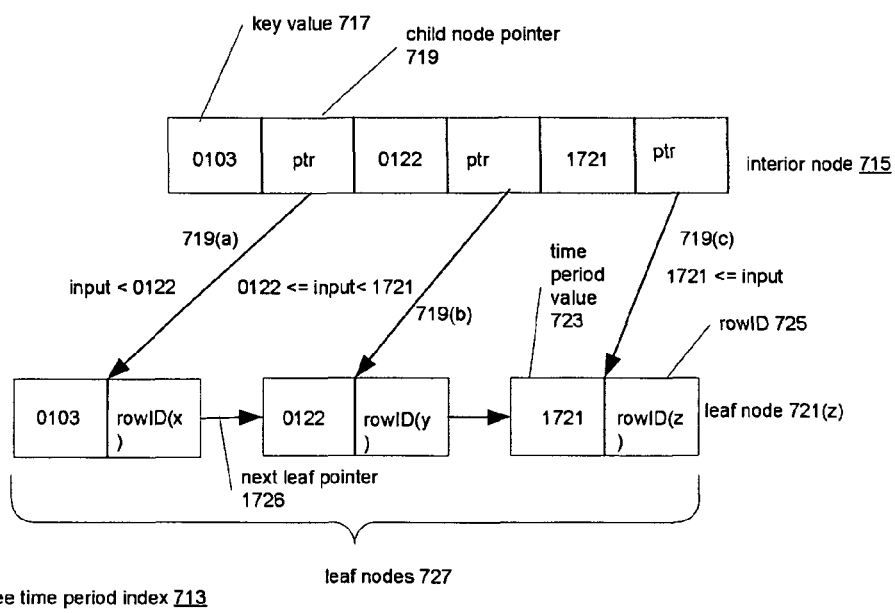
FIG. 7 shows a prior-art B+ tree time period index.

Using Time Period Indexes to Speed Up Time Period Queries: FIG. 7

Time period queries may be speeded up by the use of time period indexes. The technical report by Mario A. Nascimento and Margaret H. Dunham, *Indexing Valid Time Databases Via $B^+$ Trees—The MAP21 Approach*, TimeCenter Technical Report, March 1998 (also published as Southern Methodist University Technical Report 97-CSE-08 in March 1997) describes the state of the art as of that time concerning time period indexes and describes a new technique which they term the MAP21 approach. The entire paper, termed in the following "Nascimento", is incorporated by reference into the present patent application.

Nascimento's time period indexes are made by mapping the periods in the rows of the table into a set of time period values that have a lexicographical order that depends on the ranges mapped into the values. Thus, all the time period values are ordered by the start times of the periods they represent, and where there is more than one time period value with the same start time, those time period values are ordered by their end times. Because the time period values have a lexicographical order, they can be used in indexing trees such as $B^+$ trees.

To take a simple example, assume that the time periods of interest are all within the 24 hours of a given day and that the start times and end times are always at hour boundaries and are represented using the hours of a 24 hour clock. A set of possible periods would be 1 to 3, 1 to 22, and 17 to 21. The time period value for the period 1 to 3 is 0103; the time period value for 1 to 22 is 0122; the time period value for 17 to 21 is 1721; the lexicographical order of these values is 0103, 0122, 1721.

The simplest form of Nascimento's time period index is a tree in which there is a leaf node for each row. FIG. 7 shows a time period table 701 with columns for a RowID value 703, columns 705 containing other data, a start timestamp column 707, and an end timestamp 709. The table contains rows 711(*x*, *y*, and *z*). At 713 is shown a B+ tree time period index 713 for table 701. There are leaf nodes 727(*x, y* and *z*) corresponding to table rows 711(*x, y*, and *z*). Each leaf node contains a time period value 723 corresponding to the timestamp values 707 and 709 in the row corresponding to the leaf node and a rowID 725 which is a copy of the row's rowID 703. Because of the small number of rows in table 701, index 713 has a single interior node 715, which is also the root node for index 713's tree. Interior node 715 has key values 717 which are copies of time period values 723 from the leaf nodes and pointers 719 which point to nodes that are children of node 715. Here, the children are the leaf nodes, but with a larger table, the index would contain one or more additional levels of interior nodes between the root node and the leaf nodes, and the interior nodes of the next level down would be the children.

To use the index in a time period query, one applies a time period value to index 713. At 729 is shown how this is done in an intersection query where the given time period is 15:00 to 17:00. The time period value for this query is 1517. Because the given time period intersects any query that it overlaps in any way, the time period used to find the first leaf node must take into account the size, Δ, of the given time period, which in this case is 2. The search of the index thus begins with the time period value 1317. When 1317 is applied to root node 715, it turns out to have a value which lies between 0122 and 1721, so pointer 719(*b*) is followed to leaf node 721(*y*). Because the start time of leaf node 721(*y*)'s time period value is 01, which is less than the start time of the given time period and the end time of leaf node 721's time period value is 21, which is greater than the end time value of the given time period, the given time period intersects the time period in row 711(*y*) of table 701, and rowID(*y*) is added to the set of rowIDs to be returned. Pointer 1726 is then followed to leaf node 721(*z*); here, the start time in leaf node 721(*z*) is the same as the end time of the given time period, so the given time period intersects the time period of 721(*z*) as well. This is the last leaf node, so the search terminates, returning the rowIDs for rows 711(*y* and *z*).

Details of Nascimento's Time Period Indexes

Details of Nascimento's time period indexes which are relevant in the present context include the manner in which he deals with open-ended periods, his use of multiple index trees, and the manner in which he proposes to implement his time period indexes in a standard relational database system. To deal with open-ended periods, Nascimento uses a single index tree to index all open-ended periods. This open-ended tree is a standard B+ index tree in which the index values are the start times of the open-ended periods.

A problem with Nascimento's time period index is that the size of Δ for given time period that is being applied to the index strongly affects search performance. The reason for this is that Δ's size determines how many leaf nodes must be read in the intersection and containment queries. To overcome this problem, Nascimento partitions his time period index into a set of such time period indexes, each one of which handles time periods having a subset of the Δs that are present in the time periods present in the rows of the table being indexed.

The challenge in implementing time period indexes in a standard relational database system is to use the standard indexing facilities provided by the relational database system even though the relational database system has no notion of either time period values or time period queries. Because the time period values appear to the relational database system to be integer values, the standard B+ tree indexing facilities can be employed for the time period indexes; the temporal indexes are however used differently; consequently, Nascimento adds a temporal interface front end to the standard relational database management system which responds to time period queries by translating them into standard relational database queries which build, use, and maintain the indexes in the proper fashion. A problem with standard relational database management system indexes is that they are per-table. This often results in time period indexes which have a large range of Δs, resulting in the performance difficulties described above. To deal with this problem, Nascimento proposes dividing the table to be indexed into subtables, with each subtable containing rows whose time period values have the Δs handled by one of the time period indexes in his set of time period indexes.

While Nascimento has provided a conceptual framework for the construction of time period indexes and their use in time period queries and is even able to take advantage of the indexing facilities provided by the relational database management system, there remains the problem of fully integrating the time period indexes into a relational database management system. As it stands, a user of a relational database management system who wishes to use Nascimento's techniques must write or obtain code that subdivides the table being indexed into subtables as required for the techniques and manages the subtables and that further creates and manages the B+ tree indexes for the subtables. What is needed is an implementation of time period indexes that is fully integrated into the relational database management system and is thus available to any user of the relational database management system in the same fashion as standard B+ tree indexes are available. What follows is a description of such an implementation.

A Time Period Index That is Fully Integrated into a Relational Database Management System Background The time period index described in the following is implemented in an Oracle 10gR2 relational database management system manufactured by Oracle Corporation, Redwood City, Calif. The implementation takes advantage of the extensible indexing facilities provided by the Oracle 10gR2 relational database management system and implements the time period index using a partitioned index organized table. The extensible indexing facilities, index organized tables and partitioned tables are all described in overview in *Oracle® Database Concepts* 10*g Release* 2 (10.2), Part No. B14220-01, Jun. 2005, published by Oracle Corporation and available online at the Oracle Technology Network web site, otn.oracle.com. The Concepts document is hereby incorporated by reference into the present patent application.

Oracle provides extensible indexing to support the implementation of indexes on complex datatypes such as time period values and the implementation of methods that maintain and use the indexes. The extensible indexing facility permits definition of the index on the complex data type in terms of table columns or attributes of an object type and encapsulation of index access and management methods as an indextype schema object. The Oracle database server interacts with the index definition and the methods to build, maintain, and search the index. The index structure itself can be stored in the Oracle database as an index-organized table or externally as a file.

Index organized tables are tables which are stored in a B-tree index structure. In a standard B-tree index structure, the leaves of the B-tree contain the rowIDs or primary indexes of the rows of the table that is indexed by the B-tree. In an index-organized table, the data from the indexed table has been incorporated into the B-tree index. The leaves of the B-tree contain the data from the rows of the indexed table and the keys in the B-tree index are the primary keys for the indexed table. To an application, an index-organized table appears to be a standard database table, but the database system performs all operations on the index-organized table by manipulating the B-tree index.

Partitioned tables are tables which have subdivisions. Each subdivision may occupy its own segment in the physical storage managed by the relational database management system. There are a number of techniques for mapping the rows of the table to the subdivisions. The technique that is of particular interest in the present context is range partitioning. Range partitioning is done using a range partitioning key, that is, values from one or more columns of the table which, when taken together, provide keys that are ordered sets of values. The values in the ordered set of values belong to a range of such values and subranges of the range of values are mapped to the partitions.

Figure 8:
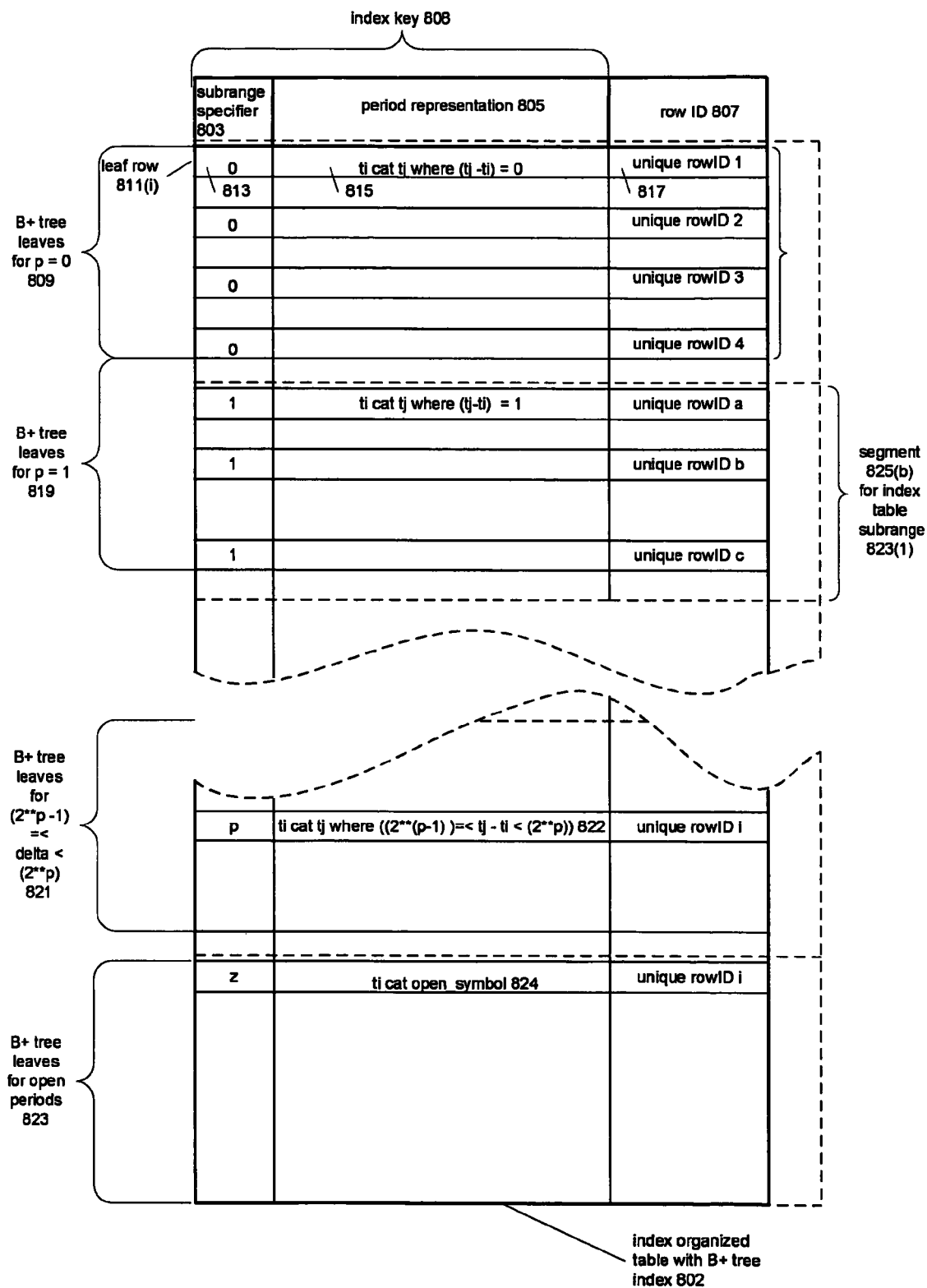
FIG. 8 shows a B+ tree time period index made using a built-in B+ tree index.

Details of Time Period Index Table 801: FIG. 8

FIG. 8 shows details of a presently-preferred implementation of time period index table 801. The implementation employs the Oracle extensible indexing facility. Time period index table 801 indexes a time period table whose rows contain data which represents periods of time A_HISTORY$ table 135 is an example of such a time period table.

The index in time period index table 801 belongs to a class of indexes that are organized as trees, with there being a leaf of the tree for each item indexed by the index. In the present case, each leaf indexes a row in a time period table which contains data representing a particular period of time. An important feature of the index is that the leaves of the index are grouped according to the sizes of the periods of time that the leaves index. The range of sizes that the leaves may represent is divided into disjunct subranges of the range of sizes and the leaves that index periods whose sizes belong to a given disjunct subrange are grouped together. The grouping makes it possible to apply periods of time to the index by the size of the subrange that the period of time's size belongs to. The grouping further permits optimizations of the index including using identifiers for the groups as part of the index's keys and placing the groups of keys in separate partitions of the index. The identifiers for the groups may be chosen so that they can be computed from the size of a period time. Where the periods of time in the index's keys are specified by a time stamp specifying a start time and a time stamp specifying an end time, the leaves belonging to a group may be ordered within the group by the start time or the end time. A simple BTree or B+Tree index on the group identifier and one of the two time stamps allows temporal queries to be handled in time proportional to the logarithm of the number of rows in the time period table being indexed.

General Organization of Table 801

In a preferred embodiment, time period index table 801 is an index organized table 801 of the type provided by Oracle relational database systems. Each row of the table contains a node of a B+ tree index. In table 801, the leaves of the B+ tree index are grouped by the sizes of the periods of time they index. The leaves in each group belong to a disjunct subrange of the range of sizes of the periods of time. Each group is identified by a subrange specifier 803 that specifies the subrange to which the sizes of the group's periods of time belong. The index organized table indexes the rows in the period data table by an index key 808 that contains the subrange specifier 803 and a time period value 805. This key is thus a range partitioning key and is a value that represents a subrange of the $\Delta$s and a period of time. Because index organized table 801 uses standard B+ tree indexing technology, the only rows of table 801 that are of interest in the present discussion are the rows 811 that represent leaf nodes of the B+ tree and the only columns of the table that are of interest in the present discussion are columns 803 and 805, which have already been explained, and 807. Column 807 contains the rowID or primary key for a row in the indexed time period table whose data includes the period specified by the value of i in field 815.

The Time Period Values i

In a preferred embodiment, a period of time $t_j$-$t_i$ is represented by a time period value i which has the Oracle RDBMS NUMBER data type and is made as follows: First, a period's start time and end time are converted into Julian seconds. Julian seconds are like Julian days, which are the number of days starting from January 1, 4713 BCE. Julian days are always positive integers. Julian seconds are like Julian days, only they express the number of seconds from the same origin date. Conversion of a TIMESTAMP to Julian seconds means determining the number of Julian days preceding the date in the TIMESTAMP and then multiplying that number by 84600 (the number of seconds in a day). Then the number of hours and minutes specified in the time stamp are converted to seconds, those seconds are added to the seconds specified in the time stamp, and the total is added to the number of Julian seconds computed for the days preceding the timestamp's date.

Once there is an integer representation of Julian seconds for the period's start time and end time, the start time is left shifted by 14 decimal positions and becomes the high order value for a NUMBER field with a precision of 28. The end time in Julian seconds is added to this number, filling in the low order 14 decimal positions. The largest period which can be represented by these time period values is $10^{15}$-1 seconds. The time period values i that are produced using this technique are lexicographically ordered by the value's start time and among values i having the same beginning time, by the end time. This ordering is of course made use of in the B+ tree index.

Groups and Subrange Specifiers

The leaves of index organized table 801 are divided into groups according to the size $\Delta$ of the time period i which the leaf indexes, where $t_j$ is the end time of the period i and $t_i$ is the start time of the period i and $\Delta = t_j - t_i$. The division into groups is done by dividing the range of values of $\Delta$ that the index will deal with into disjunct subranges. Each leaf for which the $\Delta$ of the period that leaf indexes belongs to a given subrange belongs to a group corresponding to that subrange. There is a subrange corresponding to each integer power p of 2 where $p \geq 0$. For p=0, the subrange's group contains time period values whose $\Delta$ is 0, i.e., where $t_i = t_j$. For p>0, a leaf belongs to the group corresponding to a given subrange p if the size $\Delta$ of the period that the leaf is indexing is such that $2^{(p-1)} \leq \Delta < 2^p$. Thus, the subrange for p=1 contains time period values whose $\Delta$ ranges between $2^0 \leq \Delta < 2^1$, or $1 \leq \Delta < 2$, or time period values whose $\Delta$ is 1. Similarly, the subrange for p=2 contains time period values whose $\Delta$s range between $2^1 \leq \Delta < 2^2$, or time period values having $\Delta$s 2 and 3 and the subrange for p=3 contains time period values for which $2^2 \leq \Delta < 2^3$, or time period values having $\Delta$s 4,5,6, and 7. In table 801, p is the subrange specifier for the subrange whose time period values range between $2^{(p-1)} \leq \Delta < 2^p$ and the groups defined by the subrange are ordered by the value of p for the subrange; within a subrange, the leaves of the B+ tree are ordered by the value of $t_i$ in the period. The rows of a subrange's B+ tree are stored in the segment 825 corresponding to the subrange. An important advantage of using p or a value derived by applying a function to p as the subrange specifier is that the subrange specifier for a subrange that contains a given time period may be computed from the given time period value's size.

The number of subranges depends of course on the granularity of the time stamp and the largest in the table being indexed. For example, if the granularity is one minute, 32 subranges would permit a maximum of 8000 years.

Open-Ended Periods

In a preferred embodiment, the time period value for an open-ended period has a non-positive integer value for $t_j$. When a time period table includes open-ended periods, time period index table 801 includes a last subrange 823 which contains a B$^+$ index tree for all of the time period values that represent open-ended periods. The lexicographical order of index keys 808 in this subrange is of course determined by the value of $t_i$.

In period index table 801, the index-organized object contains a single index with subdivisions for each value of p required to cover the full range of Δs for the time periods being indexed in the table. Any other arrangement could be employed which grouped the leaves of the index by the sizes of the periods they index. For example, each group could be implemented as a separate index that is related to a value of p or as a separate index object that is so related. It should also be pointed out that the technique of subdividing leaves of an index so that all of the leaves in a subdivision have Δs belonging to a particular disjunct range thereof can be applied to indexes that use index trees other than B$^+$ trees.

Methods for Table 801: FIG. 10

Because table 801 belongs to a table type that is standard in Oracle RDBMS's, the methods that manipulate table 891 may be defined in terms of standard SQL operations on table 801. FIG. 10 shows at 1001 how this can be done with a time period table timetable10k that has a time index table timetable10k_time_index that is built on the principles of table 801. SQL code 1003 retrieves rows from timetable10k 1005 that specify periods of time which intersect the period 2004-OCT-21 07.00.32 to 2004-OCT-21 09.30.00.

Function xti_intersects_period (<time period_value>) 1007 is one of the methods that are implemented for time period indexes such as table 801. Method 1007 determines which rows of timetable10k intersect the time period value returned by xti_time_index.make_period 1009, which is another method that is implemented for time period indexes like time index 801. The method takes the arguments shown at 1011, namely a first time stamp value that indicates the start time and a second time stamp value that indicates the end time and a string that shows how the time stamps are to be interpreted. Method 1009 then makes and returns the time period value against which the periods of time in table timetable10k's rows are tested.

The SQL at 1015 shows in pertinent part how xti_intersects_period 1007 is implemented. The SQL for the method uses queries on the index timetable10k_time_index 1017 to find the rows whose periods of time intersect the time period defined by arguments 1011. The queries are done by group of leaves, beginning with the leaves belonging to the subrange with the smallest Δs and moving up through the groups whose subranges have larger Δs. At 1018 is shown the WHERE clause for a query for periods whose deltas belong to subrange 3, that is, for periods whose Δs range from 4 through 7. The subrange specifier is indicated by the assignment to partition_id=3 at 1019. The subrange specifier can also be computed directly from the Δ for the time period that is currently being tested for intersection. The variable period contains the time period from the row in subrange 3 which is currently being tested for intersection with the time period defined at 1011. The BETWEEN predicate applies the value of period to the time period defined at 1022. Time period 1011 is defined using the time period index method encode_period, which converts a time stamp value to a Julian second value. Because the BETWEEN operation returns the intersection of the time period value in period with the period defined by the two time stamps 1023 and 1025, the beginning time stamp 1023 of the time period is decreased by 8 seconds and the ending time stamp 1025 of the time period is increased by 8 seconds, so that the > test applied by the query to the beginning of period 1022 and the < test applied by the query to the end of period 1011 cover the Δs of the time periods belonging to subrange 3.

Using Time Period Indexes with History-Enabled Tables: FIGS. 9 and 11

FIG. 9 shows time period indexes as they would be used with the history-enabled table A 131 and its history table A_History$ 135. In Oracle relational database management systems, an index may index only a single table. Consequently, two index tables are required: a time period index table 903 for the closed periods of A_HISTORY$ 135 and a separate open ended time period index table 907 for table A 131.

As explained in the discussion of history-enabled tables, queries on history-enabled tables are made on a view A_HISTORY_VIEW$ 141 which contains the union of the rows of history-enabled table A 131 and A_HISTORY$ 135. FIG. 11 shows at 1103 a location query on A_HISTORY_VIEW$ 141 that returns all of the rows of either table A 135 or table A_HISTORY$ 135 whose time periods included the instant of time '2004-Oct.-21 09.30.00' As also explained in the discussion of history-enabled tables, AS_OF 1105 is a function which performs the location query. Function 1105 is of course also a method that is associated with time period indexes.

AS_OF function 1105 performs the SQL query 1107, which uses another method associated with time period indexes, xti_intersects_point method 1109 in the manner described above for the xti_intersect period method 1005 to perform the location query, A query optimizer which is a standard component of Oracle relational database management systems then rewrites query 1107 as shown at 1110 to take advantage of time period indexes 903 and 909. The optimizer rewrites query 1107 into two queries, one, query 1111, on table A 131 that uses index table 907 and one query 1115 on table A_HISTORY$ 135 which uses index table 903 and then performs the UNION 1113 of the results of queries 1111 and 1115. The UNION 1113 is then returned as the result of query 1103.

CONCLUSION

The foregoing Detailed description has disclosed to those skilled in the relevant technologies how to make and use indexes for time period table objects in a relational database system and has further disclosed the best mode known to the inventors of making and using their indexes. It will be immediately apparent to those skilled in the relevant technologies that the concepts which have been employed in the indexes can be employed in many other embodiments of the indexes. For example, the embodiment disclosed herein has been implemented using the Oracle extensible indexing facility, Oracle index-organized objects, and Oracle B$^+$ tree indexes, and certain features of the preferred embodiment are characteristic of its implementation in this manner. The indexes of the invention may further be implemented using index trees other than B$^+$ trees and with less than all of the features of the preferred embodiment disclosed herein. In some implementations, the index may simply group leaves by subranges of the range of period sizes; in others, the index's keys may indicate a group; in others, a group may have its own partition in the table; the specifier for the group that a time period belongs to may or may not be computable from the group's size. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. An index object in a relational database management system, the relational database system being implemented using a data storage device and a processor that has access thereto and the index object comprising:
   an index organized table that is stored in the data storage device and manipulated by the processor, the index organized table containing a B+ index for a time period table object that is stored in the data storage device and manipulated by the processor, the time period table object having one or more time period columns from whose values in the time period table object's rows periods of time are determinable and the index object having leaf nodes which index the rows of the time period table object by the periods of time, the periods of time having a range of sizes and the index organized table including
   a row for each leaf node in the index and columns including
      a column for subrange specifiers, the subrange specifiers specifying disjunct subranges of the range of sizes,
      a column for period representations for periods of time in corresponding rows of the time period table object, and
      a column for row identifiers for the corresponding rows in the time period table object,
   the row for a given leaf node having
      in its row identifier column the row identifier for the time period table object row indexed by the given leaf node,
      in its period representation column a representation of the period of time which is determinable from the time period table object row indexed by the given leaf node, and
      in its subrange specifier column the subrange to which the size of the period of time specified by the representation of the period of time belongs, the rows for the leaves of the index being grouped in the index organized table according to the sizes specified by their subrange specifiers, and the relational database management system using the index organized table to obtain rows of the time period table object that satisfy a temporal query; and
   the index organized table employs representations of open-ended time intervals, the open-ended time intervals beginning with start time values to index a set of current rows.

2. The index object set forth in claim 1 wherein:
the subrange specifiers have a lexicographical order.

3. The index object set forth in claim 2 wherein:
each subrange speedier has a value based on the range of sizes contained in the subrange.

4. The index object set forth in claim 3 wherein:
the value of a subrange specifier for which contains the range of sizes to which the size of a given period of time belongs may he computed from the size of the given period of time.

5. The index object set forth in claim 4 wherein:
for a size of a period of time that is greater than 0, the value of the subrange specifier for the size is an integer power $\rho$ of 2 such that the size is in a range defined by $2_{\rho-1}$ and $2_\rho$ or in the alternative $2_\rho$ and $2_{\rho+1}$.

6. The index object set forth in claim 1 wherein:
the period representations include a representation of a start time and a representation of an end time,
wherein the rows of the index organized table are ordered in the grouping by size according to the representation of the start time.

7. The index object set forth in claim 1 wherein:
the index organized table is divided into partitions;
each of the subranges has its own partition; and
the leaves belonging to the subrange are stored in the subrange's partition.

8. A data storage device characterized in that:
the data storage device contains the index object set forth in claim 1.

9. The index set forth in claim 1 wherein:
the period representations may indicate open periods; and
the groups includes a group containing leaves whose period values indicate open periods.

10. A system of objects for history-enabling a table in a relational database management system, the relational database management system being implemented using a data storage device and a processor that has access to the data storage device, the system of objects being stored in the data storage device and being manipulated by the processor and the system of objects comprising:
   a history-enabled table object including
      a set of other columns of the table;
      a start time column for row start time values; and
      a set of current rows, a current row containing current values of the fields that belong to the other columns and a start time value which indicates a time at which the most recent change in the current values occurred;
   and a history table object including
      the set of other columns or a subset thereof;
      a start time column; and
      a period column for row period values; and
      a set of history rows, the history rows having values in the set or subset of the other columns and the start time column which are copied from a current row on depletion or updating of the current row and a row period value which is set to indicate the period between the copied start time value and the time of the update or deletion of the copied current row; and
   a history table index object that indexes the history rows by the row period values in the rows, the row period values having a range of sizes and the history table index object containing an index with leaf nodes corresponding to the history rows, the history table index object including
      a row for each leaf node in the index;
      a column for subrange specifiers specifying a subrange of the range of sizes, a row for a leaf node corresponding to a given history row having a subrange specifier that specifies the disjunct subrange to which the size of the period specified by the given history row's row period value belongs;
      a column for period representations for periods of time, the row for the leaf node corresponding to the given history row having a period representation representing the period specified by the given history row's row period value;
a column for row identifiers for the corresponding history rows, the row for the leaf node corresponding to the given history row having a row identifier for the given history row, the rows for the leaf nodes being grouped according to their subrange specifiers, and the relational database management system using the history table index object to obtain rows of the history table object that satisfy a temporal query; and
the history table index object employs representations of open-ended time intervals, the open-ended time intervals beginning with the start time values to index the set of current rows.

11. A data storage device characterized in that:
the data storage device contains the system of objects set forth in claim 10.

12. The index object of claim 1, wherein the temporal query is executed on the index organized table and the time period table without a need to translate the temporal query into a standard relational database query.

13. The system of claim 10, wherein the temporal query is executed on the history table index object and the history table object without a need to translate the temporal query into a standard relational database query.

14. An index object in a relational database management system, the index comprising:
a data storage device implementing the relational database management;
a processor, wherein the processor accesses the data storage device and manipulates the index object's index indexing rows in a time period table object according to values in the rows which specify periods of time, the periods of time having a range of sizes, the index object, and the time period table object being stored in the data storage device; and
wherein the index further comprises leaf nodes that index the time period table object's rows, the leaf nodes being organized in the index into groups by the size of the time period specified in the time period object row indexed by the leaf node, each group corresponding to a disjunct subrange of the range of sizes, and the relational database management system using the index object to obtain rows of the time period table object that satisfy a temporal query; and
the index object employs representations of open-ended time intervals, the open-ended time intervals beginning with start time values to index a set of current rows.

* * * * *